(12) United States Patent
Umeda et al.

(10) Patent No.: US 7,560,837 B2
(45) Date of Patent: Jul. 14, 2009

(54) AUTOMOTIVE ALTERNATOR WITH ROTARY MAGNETIC FLUCTUATION SUPPRESSOR

(75) Inventors: Atsushi Umeda, Okazaki (JP); Tsutomu Shiga, Nukata-gun (JP); Kouichi Ihata, Okazaki (JP)

(73) Assignee: Denso Corporation, Tokyo (JP)

( * ) Notice: Subject to any disclaimer, the term of this patent is extended or adjusted under 35 U.S.C. 154(b) by 417 days.

(21) Appl. No.: 11/272,319

(22) Filed: Nov. 14, 2005

(65) Prior Publication Data

US 2006/0103246 A1 May 18, 2006

(30) Foreign Application Priority Data

Nov. 12, 2004 (JP) .............................. 2004-328311

(51) Int. Cl.
*H02K 9/06* (2006.01)
*H02K 49/04* (2006.01)
(52) U.S. Cl. ............................ 310/51; 310/58; 310/105
(58) Field of Classification Search ................... 310/51, 310/58–63, 105
See application file for complete search history.

(56) References Cited

U.S. PATENT DOCUMENTS

| | | | | |
|---|---|---|---|---|
| 3,826,937 A | * | 7/1974 | Davies | 310/105 |
| 3,951,006 A | * | 4/1976 | Fisher et al. | 474/87 |
| 4,446,391 A | | 5/1984 | Sekine et al. | |
| 4,482,830 A | * | 11/1984 | Iwaki et al. | 310/113 |
| 4,725,259 A | | 2/1988 | Miyata | |
| 6,083,130 A | | 7/2000 | Mevissen et al. | |
| 6,462,440 B1 | | 10/2002 | Asao et al. | |

FOREIGN PATENT DOCUMENTS

| | | |
|---|---|---|
| GB | 948 013 A | 1/1964 |
| GB | 2 102 216 A | 1/1983 |
| JP | A 61-112544 | 5/1986 |
| JP | 61-228153 | 10/1986 |
| JP | A 62-092759 | 4/1987 |
| JP | A 62-144546 | 6/1987 |
| JP | A 4-302719 | 10/1992 |
| JP | A 7-7887 | 1/1995 |
| JP | A 11-032465 | 2/1999 |
| JP | 2001-523325 | 11/2001 |
| JP | A 2002-058193 | 2/2002 |
| JP | A 2003-247600 | 9/2003 |

* cited by examiner

*Primary Examiner*—Quyen Leung
*Assistant Examiner*—David W. Scheuermann
(74) *Attorney, Agent, or Firm*—Oliff & Berridge, PLC (57) ABSTRACT

An automotive alternator includes a rotary shaft, a pulley, a stator, a rotor, and a magnetic fluctuation suppressor. The pulley is provided on the rotary shaft to transmit rotating power from an engine to the rotary shaft. The stator includes a stator winding. The rotor is mounted on the rotary shaft and configured to provide a first rotating magnetic field to the stator. The magnetic fluctuation suppressor includes a magnetic body and a magnetic source. The magnetic body is mounted on the rotary shaft such that the magnetic body is rotatable along with the rotary shaft at a rotational speed different from that of the rotary shaft. The magnetic source is fixed to the rotary shaft so as to create a second rotating magnetic field which induces a magnetic attraction between the magnetic body and the magnetic source, by which fluctuations in rotational movement of the rotary shaft are suppressed.

9 Claims, 4 Drawing Sheets

AUTOMOTIVE ALTERNATOR WITH ROTARY MAGNETIC FLUCTUATION SUPPRESSOR

CROSS-REFERENCE TO RELATED APPLICATION

This application claims priority from Japanese Patent Application No. 2004-328311, filed on Nov. 12, 2004, the content of which is hereby incorporated by reference into this application.

BACKGROUND OF THE INVENTION

1. Technical Field of the Invention

The present invention relates generally to alternators and drive systems for automotive vehicles. More particularly, the invention relates to an automotive alternator that is supplied with rotating power from an engine via a belt of a serpentine belt drive system and includes a magnetic fluctuation suppressor for suppressing fluctuations in rotational movement of the alternator.

2. Description of the Related Art

In recent years, the problem of engine noise has been widely addressed; in order to make engines quiet, research on engine vibration control and engine rotation stabilization has been actively conducted.

Typically, in a serpentine belt drive system for an automotive vehicle, an internal combustion engine drives, via a belt, a plurality of auxiliary machines (or accessories) that includes an alternator, an air conditioning compressor, a water pump, and an oil pump (for power steering). In such a system, an unstable behavior of an auxiliary machine that has a large moment of inertia will cause the engine to rotate unstably. Generally, the equivalent moment of inertia of an auxiliary machine is proportional to the square of the speed increasing ratio of the auxiliary machine with respect to the engine. Among the auxiliary machines, the alternator has both a large inertia and a large speed increasing ratio; thus, suppression of fluctuations in rotational movement of the alternator is critical to the stabilization of rotation of the engine.

As an approach to suppress fluctuations in rotational movement of an automotive alternator, theories that have been developed to solve vibration suppression problems can be applied. Specifically, the following two vibration suppression methods can be considered.

Vibration absorption

Vibration isolation

The first method is to employ a dynamic vibration absorber to absorb vibrations of a target body in a specific resonance area. The dynamic vibration absorber is configured with a weight, which has a mass equal to about one tenth of that of the target body, and an elastic body with a suitable spring rate (or elastic constant). The dynamic vibration absorber is also configured to have a suitable attenuation coefficient.

In the case of applying the first method to an automotive alternator, it is necessary to connect a weight, which has a suitable mass and will accordingly produce a suitable moment of inertia, to a rotor or a rotary shaft of the alternator via a suitable elastic body (e.g., a spring).

The second method is to arrange a vibration isolator in the vibration transfer path from a vibrating body to an associated body, thereby preventing vibrations of the vibrating body from transferring to the associated body.

In the case of applying the second method to an automotive alternator, it is necessary to arrange a fluctuation isolator in the fluctuation transfer path from the alternator to an engine that drives the alternator.

Japanese Patent First Publication No. S61-228153, an English equivalent of which is U.S. Pat. No. 4,725,259, discloses an automotive alternator, in which a one-way clutch is employed to selectively connect or disconnect a rotary shaft and a pulley that is driven by an engine via a belt. The one-way clutch may serve as a fluctuation isolator, which prevents fluctuations in rotational movement of the alternator from transferring to the engine by disconnecting the rotary shaft from the pulley.

Japanese Translation of International Publication No. 2001-523325, an English equivalent of which is U.S. Pat. No. 6,083,130, discloses an automotive alternator, in which a spring and one-way clutch mechanism is employed to connect a rotary shaft and a pulley that is driven by an engine via a belt. The spring and one-way clutch mechanism may serve as a fluctuation isolator, which prevents fluctuations in rotational movement of the alternator from transferring to the engine by absorbing the fluctuations.

However, when a mechanical element, such as a spring and a clutch, is employed to suppress fluctuations in rotational movement of an automotive alternator, a torque for power generation, a torque due to the inertia of the alternator, and a centrifugal force of the mechanical element will act on the connection between a rotor or a rotary shaft of the alternator and the mechanical element. Consequently, if not properly designed and constructed, the connection would be broken, thus resulting in a failure of the alternator, or even the whole drive system.

Accordingly, it is required to carefully design and construct, under durability requirements and dimensional constraints, an automotive alternator that has a mechanical fluctuation suppressor for suppressing fluctuations in rotational movement of the alternator. However, this will increase the number of product types and manufacturing cost of the alternator.

SUMMARY OF THE INVENTION

The present invention has been made in view of the above-mentioned problem.

It is, therefore, a primary object of the present invention to provide an automotive alternator with a magnetic fluctuation suppressor that is configured to suppress fluctuations in rotational movement of the alternator using a magnetic force without employing any mechanical elements.

According to the first aspect of the invention, an automotive alternator is provided which includes a rotary shaft, a pulley, a stator, a rotor, and a magnetic fluctuation suppressor.

The pulley is provided on the rotary shaft so as to transmit a rotating power from an engine to the rotary shaft. The stator includes a stator winding. The rotor is mounted on the rotary shaft and surrounded by the stator. The rotor is configured to provide a first rotating magnetic field to the stator.

The magnetic fluctuation suppressor includes a magnetic body, which is made of a magnetic material and has a predetermined mass, and a magnetic source. The magnetic body is mounted on the rotary shaft such that the magnetic body is rotatable along with the rotary shaft at a rotational speed different from that of the rotary shaft. The magnetic source is fixed to the rotary shaft so as to provide the magnetic body with a second rotating magnetic field which causes the magnetic body to produce a magnetic attraction to the magnetic source by which fluctuations in rotational movement of the rotary shaft are suppressed.

With such a configuration, since no mechanical element, such as a spring and a clutch, is employed for the magnetic fluctuation suppressor, mechanical failure of the magnetic fluctuation suppressor due to excessive stress and fatigue is prevented. Consequently, the reliability of the magnetic fluctuation suppressor and thus that of the automotive alternator are improved.

Moreover, compared to exiting mechanical fluctuation suppressors, the magnetic fluctuation suppressor has a much simpler structure, thereby facilitating design and construction and reducing manufacturing cost.

According to the second aspect of the invention, in the above automotive alternator, the magnetic body includes a first member and a second member. The first member is made of iron. The second member is made of a metal having an electric resistivity less than that of iron and positioned between the first member and the magnetic source. The magnetic source includes, on an end face thereof facing the second member of the magnetic body, a plurality of magnetic poles by which the second rotating magnetic field is created.

With such an arrangement, the magnetic body and the magnetic source together form an induction machine, so that the magnetic body can produce the magnetic attraction to the magnetic source.

Consequently, it becomes possible to impart a high capability of suppressing rotational movement fluctuations to the automotive alternator, without increasing the size and manufacturing cost of the automotive alternator.

According to the third aspect of the invention, in the above automotive alternator, the magnetic source of the magnetic fluctuation suppressor has the same number of magnetic poles as the rotor.

As a result, it becomes possible to maximize the magnetic attraction through making the polar character of the magnetic source coincident with that of the rotor, thereby minimizing the size and cost of the magnetic fluctuation suppressor.

According to the fourth aspect of the invention, in the above automotive alternator, the magnetic source of the magnetic fluctuation suppressor may be configured with a plurality of permanent magnets.

As a result, the magnetic source can be made small and be easily fixed to the rotor. In addition, it is easy to adjust the magnetic attraction by changing the thickness and area of the permanents magnets.

Otherwise, the magnetic source of the magnetic fluctuation suppressor may be configured with a pair of lundell type cores and a winding wound around the cores.

In this case, since a plurality of magnetic poles can be obtained by employing only the pair of lundell type cores and the single winding, manufacturing cost of the magnetic source can be reduced.

Moreover, it is possible to control the magnetic intensity of the magnetic source through control of an electric current supply to the winding, thus allowing the magnetic attraction between the magnetic body and the magnetic source to have any necessary value.

Consequently, it becomes possible to optimally change the spring constant of the magnetic fluctuation suppressor according to operating condition of the engine, thereby improving the fluctuation suppression capability of the magnetic fluctuation suppressor. In addition, it also becomes possible, through stopping the electric current supply to the winding, to allow the magnetic body not to produce the magnetic attraction at high rotational speed, thereby securing safety and reliability of the automotive alternator.

According to the fifth aspect of the invention, in the above automotive alternator, the rotor includes a rotor core and a field winding wound around the rotor core, and the magnetic source of the magnetic fluctuation suppressor is provided on an axial end face of the rotor core.

As a result, it becomes easy for the magnetic source to provide the second rotating magnetic field to the magnetic body. In addition, it also becomes easy to fix the magnetic source to the rotor.

According to the sixth aspect of the invention, in the above automotive alternator, the magnetic body of the magnetic fluctuation suppressor is so formed to include a plurality of blades, on which air resistance acts when the magnetic body rotates along with the rotary shaft.

As a result, the air resistance will make up a damping force against the magnetic body. This damping force allows the magnetic attraction to be made small, thus making it possible to reduce the size of the magnetic source. In addition, it also becomes possible to save the available space within the automotive alternator by integrating the magnetic body and a cooling fan, without sacrificing the cooling ability of the cooling fan.

According to the seventh aspect of the invention, in the above automotive alternator, the pulley is to be driven by a belt of a serpentine belt drive system to transmit the rotating power from the engine to the rotary shaft.

In such a drive system, since the engine drives a plurality of auxiliary machines via a single belt, rotation of the engine is apt to become unstable.

However, by means of the magnetic fluctuation suppressor, fluctuations in rotational movement of the automotive alternator are suppressed, which has the largest moment of inertia among the auxiliary machines, thereby ensuring the stability of the engine rotation.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-5.

It should be noted that, for the sake of clarity and understanding, identical components having identical functions in different embodiments of the invention have been marked, where possible, with the same reference numerals in each of the figures.

First Embodiment

Figure 1:
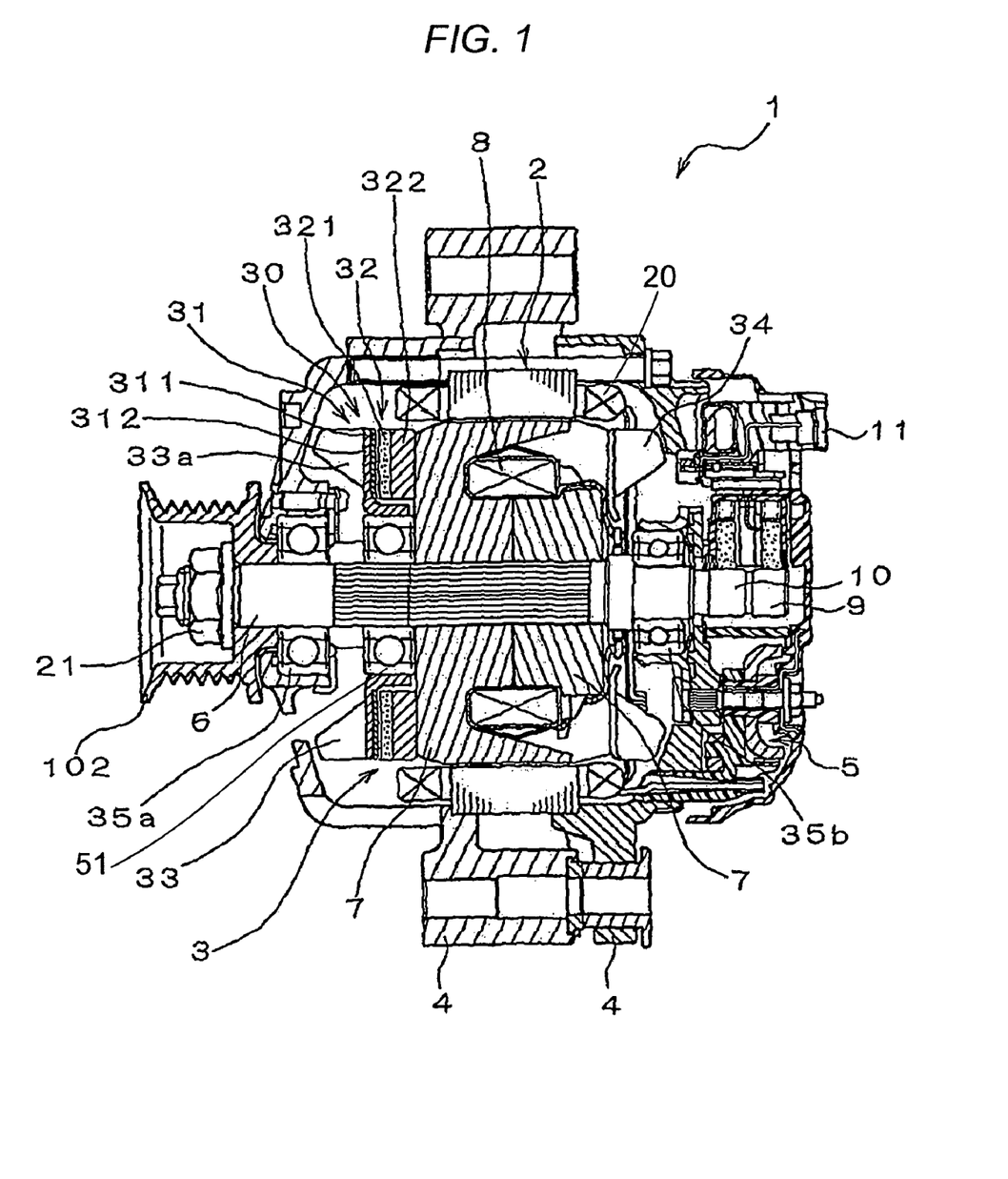
FIG. 1 is a cross-sectional view showing the overall configuration of an automotive alternator according to the first embodiment of the invention.
Figure 2:
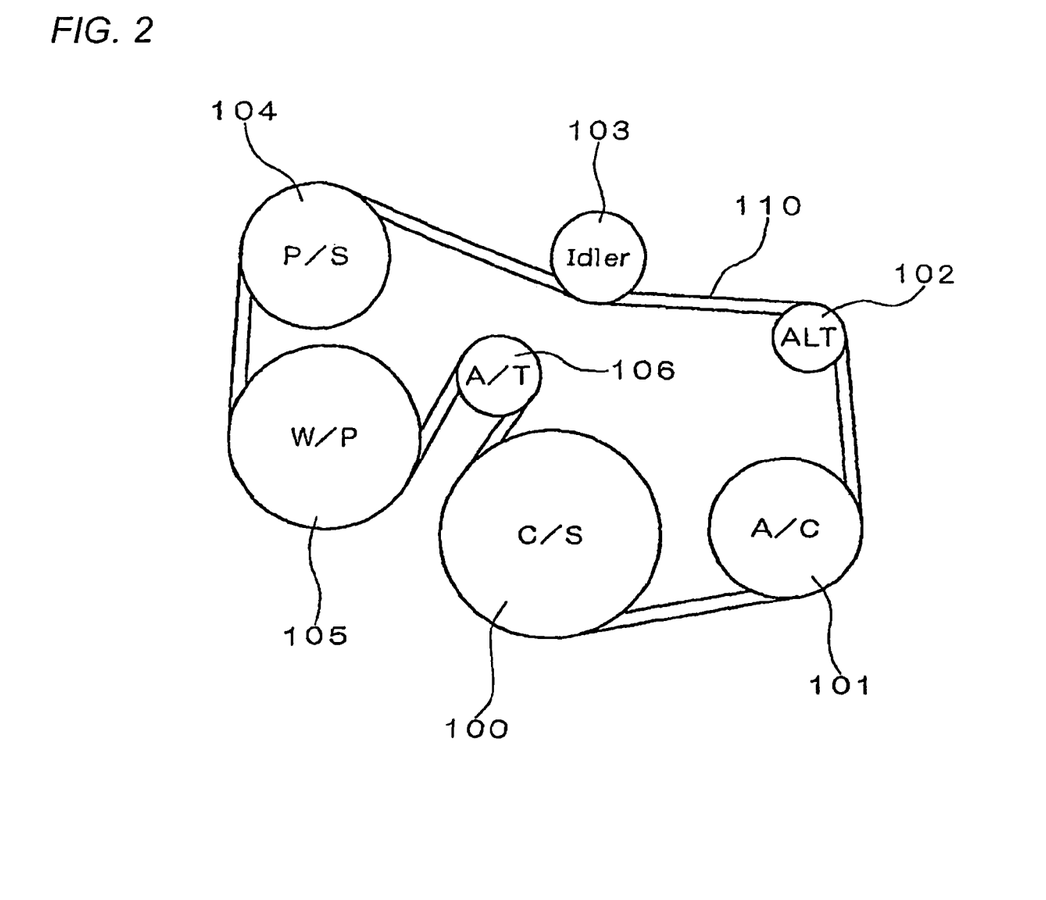
FIG. 2 is a schematic view showing the overall configuration of a serpentine belt drive system for an automotive vehicle which includes the automotive alternator of FIG. 1.

FIG. 1 shows the overall configuration of an automotive alternator (or generator) 1 according to the first embodiment of the present invention. FIG. 2 shows the overall configuration of a serpentine belt drive system for an automotive vehicle which includes the automotive alternator 1.

As shown in FIG. 2, in the serpentine belt drive system, seven pulleys 100-106 are respectively mounted on a crank shaft (C/S) of an engine and rotary shafts of an air conditioning compressor (A/C), the automotive alternator 1 (ALT), an idler (Idler), an oil pump for power steering (P/S), a water pump (W/P), and an auto tensioner (A/T). The pulleys 100-106 are connected together via a belt 110, so that rotating power can be transmitted from the engine to the six auxiliary machines (or accessories).

Each of the auxiliary machines has a given gear ratio with respect to the engine. For example, the ratio of diameter between the pulley 100 of the engine and the pulley 102 of the automotive alternator 1 is set to 1/3.3, so that the speed increasing ratio of the automotive alternator 1 with respect to the engine is equal to 3.3.

Referring now to FIG. 1, the automotive alternator 1 includes a stator 2, a rotor 3, a housing 4, a rectifier assembly 5, a voltage regulator 11, and a magnetic fluctuation suppressor 30.

The stator 2 includes a stator winding 20.

The rotor 3 is mounted on a rotary shaft 6 and surrounded by the stator 2. The rotor 3 includes a pair of lundell type cores 7 and a field winding 8 wound around the cores 7, so as to provide a rotating magnetic field to the stator winding 20 for electric power generation.

The rotary shaft 6 is rotatably supported by bearings 35a and 35b. To one end of the rotary shaft 6, there is fixed the pulley 102 by means of a nut 21; to the other end, there are mounted slip rings 9, and 10. Additionally, cooling fans 33, and 34 are provided on the rotary shaft 6, so as to create a cooling air flow with rotation of the rotary shaft 6.

The housing 4 is provided to accommodate the stator 2 and the rotor 3.

The rectifier assembly 5 is electrically connected to the stator winding 20 of the stator 2 and configured to convert an AC power outputted from the stator 2 to a DC power.

The voltage regulator 11 is configured to regulate an output voltage of the automotive alternator 1 by controlling a field current supply to the field winding 8 of the rotor 3.

The magnetic fluctuation suppressor 30 is provided to suppress fluctuations in rotational movement of the rotary shaft 6. The magnetic fluctuation suppressor 30 is configured with a magnetic body 31 and a magnetic source 32.

The magnetic body 31 is disk-shaped and has a predetermined mass. The magnetic body 31 includes a metal plate 311 and a base member 312. The metal plate 311 is made of a metal having a less electric resistivity than iron (Fe), such as aluminum (Al) and copper (Cu). On the other hand, the base member 312 is made of iron, which is a magnetic material. The metal plate 311 and the base member 312 are joined together by, for example, adhesive bonding. It should be noted that the base member 312 may also be made of other magnetic materials instead of iron.

The base portion 312 is so formed to include a plurality of blades 33a, which together make up the cooling fan 33. The base portion 312 is mounted on the rotary shaft 6 via a bearing 51, so that the magnetic body 31 can rotate freely. More specifically, the magnetic body 31 is rotatable along with the rotary shaft 6 at a rotational speed different from that of the rotary shaft 6.

Consequently, the magnetic body 31 will produce a certain amount of moment of inertia when rotating at a given rotational speed.

Figure 3:
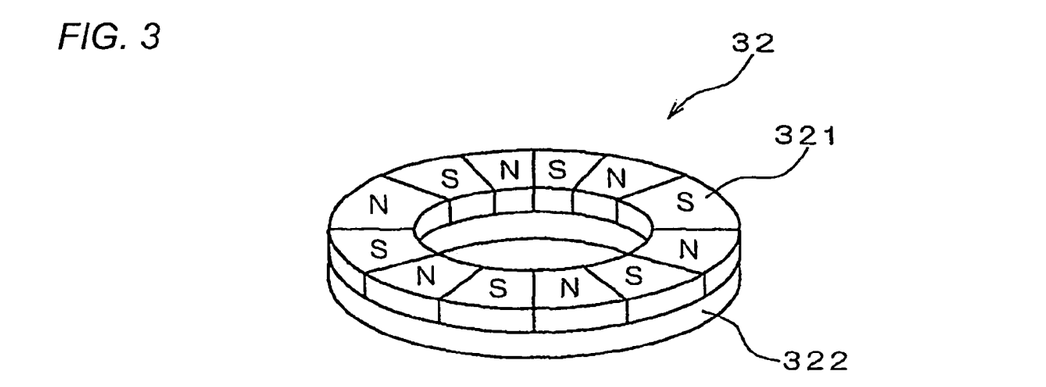
FIG. 3 is a perspective view showing a magnetic source of a magnetic fluctuation suppressor employed in the automotive alternator of FIG. 1.

The magnetic source 32 includes, with reference to FIGS. 1 and 3, a plurality of permanent magnets 321 and a base member 322 that is made of a magnetic material such as iron. The permanent magnets 321 are fixed to one end face of the base member 322. The other end face of the base member 322 is joined to an axial end face of the rotor core 7 of the pulley 102 side. Consequently, the magnetic source 32 will rotate together with the rotary shaft 6 and the rotor 3 at the same speed.

The magnetic source 32 is configured to have the same number of magnetic poles as the rotor 3. For example, when each of the rotor cores 7 has formed therein eight claw poles so that the rotor 3 has a total of 16 magnetic poles, the magnetic source 32 has accordingly 16 magnetic poles. More specifically, in this case, the magnetic source 32 includes eight N-pole permanent magnets and eight S-pole permanent magnets, which are arranged alternately in the circumferential direction.

The above-described magnetic body 31 and magnetic source 32 are so arranged in the axial direction of the rotary shaft 6 that there is formed an air gap of about 0.3 mm between the metal plate 311 of the magnetic body 31 and the permanent magnets 321 of the magnetic source 32.

Having described the overall configuration of the automotive alternator 1, the operating principle and the setting method of key factors of the magnetic fluctuation suppressor 30 will be described hereinafter.

The following is the dynamic equation of a serpentine belt drive system as shown in FIG. 2, in which an engine drives a total of n auxiliary machines via a belt:

$$J_i \ddot{\beta}_i = -c_i(R_i \dot{\beta}_i - R_{i-1}\dot{\beta}_{i-1})R_i - c_{i+1}(R_i \dot{\beta}_i - R_{i+1}\dot{\beta}_{i+1})R_i - \\ k_i(R_i \beta_i - R_{i-1}\beta_{i-1})R_i - k_{i+1}(R_i \beta_i - R_{i+1}\beta_{i+1})R_i - P_i R_i,$$ (Equation 1)

where $J_i$ is the moment of inertia of the i th auxiliary machine,
$\ddot{\beta}_i$ is the angular acceleration of the ith auxiliary machine,
$\dot{\beta}_i$ is the angular rate of the ith auxiliary machine,
$k_i$ is the belt spring constant on the tight side of the ith auxiliary machine,
$k_{i+1}$ is the belt spring constant on the slack side of the ith auxiliary machine,
$c_i$ is the belt damping coefficient on the tight side of the ith auxiliary machine,
$c_{i+1}$ is the belt damping coefficient on the slack side of the ith auxiliary machine,
$P_i$ is the driving force applied to the ith auxiliary machine,
$R_i$ is the radius of the ith auxiliary machine, and
i=1, 2, . . . , n.

Each of the n auxiliary machines has a natural frequency, and when the natural frequency coincides with the variation frequency of output torque of the engine, a large fluctuation in rotational movement of the auxiliary machine will occur. For the sake of convenience, hereinafter, the natural frequency and occurrence of such a large fluctuation in rotational movement will be figuratively referred to as the resonance frequency and resonance of the auxiliary machine, respectively.

In this embodiment, the magnetic fluctuation suppressor 30 is designed mainly for preventing the most critical resonance, i.e., the resonance of the automotive alternator 1 that occurs when the engine rotates in the lowest speed ranges (idling area).

To this end, the characteristic value and characteristic vector of the above Equation 1 is found. Then, using the characteristic vector, the mode equivalent moment of inertia $J_a$ and the mode equivalent spring constant $K_a$ of the automotive alternator 1 are obtained. Based on the obtained parameters $J_a$ and $K_a$, the resonance frequency $f_a$ of the automotive alternator 1 can be determined by the following equation:

$$f_a = \frac{1}{2\pi}\sqrt{\frac{k_a}{J_a}} \quad \text{(Equation 2)}$$

On the other hand, the output torque of the engine varies with the combustion process. For example, when the engine has six cylinders, the variation frequency $f_e$ of the engine output torque is three times the rotational frequency of the engine. Moreover, when the rotational speed of the engine in the idling area is in the range of 800 to 900 rpm, the rotational frequency of the engine is accordingly in the range of (800/60) to (900/60) Hz. Consequently, the variation frequency $f_e$ of the engine output torque in the idling area falls in the range of 40 to 45 Hz.

Figure 4:
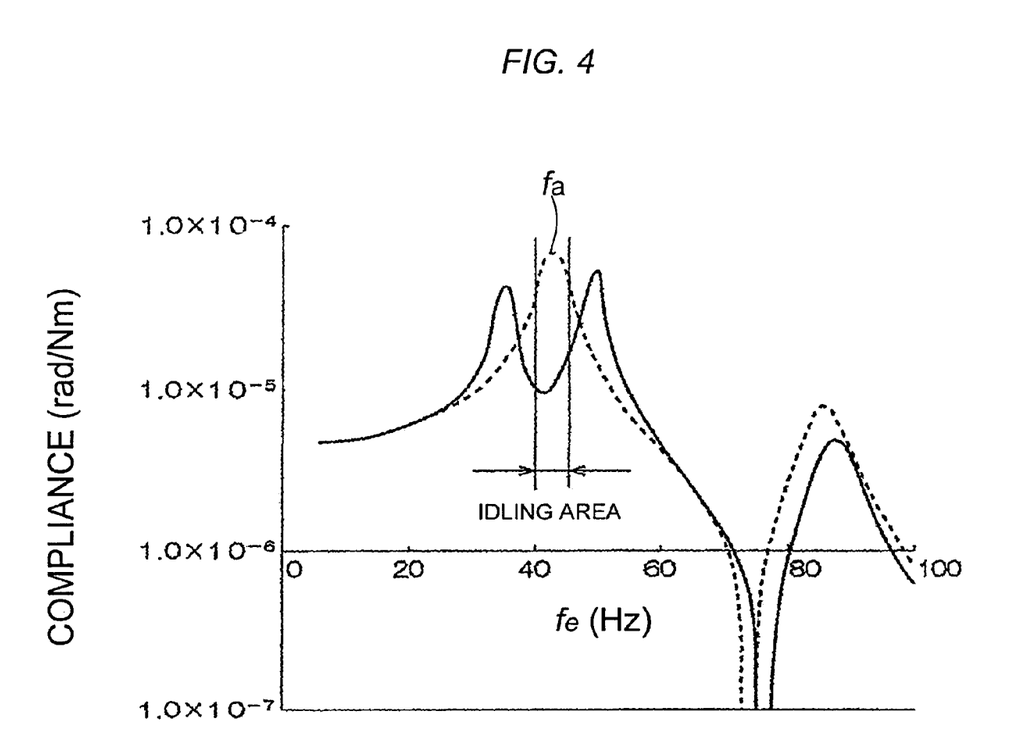
FIG. 4 is a graphical representation illustrating the effect of the magnetic fluctuation suppressor.

FIG. 4 comparatively shows the results of a resonance analysis for a conventional automotive alternator without any fluctuation suppressor and those for the automotive alternator 1 with the magnetic fluctuation suppressor 30; both the automotive alternators are analyzed on condition that they are used in the serpentine belt drive system shown in FIG. 2.

In FIG. 4, the dashed line indicates the results for the conventional automotive alternator, while the solid line indicates those for the automotive alternator 1; the horizontal axis represents the variation frequency $f_e$ of the engine output torque, while the vertical axis represents compliance that indicates the displacement of the rotor of the automotive alternator induced when the engine outputs a 1 Nm torque to the crank shaft.

As seen from FIG. 4, the conventional automotive alternator has a resonance frequency $f_a$ of about 42 Hz. In other words, a large fluctuation in rotational movement of the automotive alternator will occur when the engine runs in the idling area. Additionally, in this case, the corresponding mode equivalent moment of inertia $J_a$ and the mode equivalent spring constant $K_a$ of the automotive alternator are 0.0041 kg/m², and 289 Nm/rad, respectively.

In comparison, the automotive alternator 1 according to the present embodiment includes the magnetic fluctuation suppressor 30 that is configured with the magnetic body 31 and the magnetic source 32.

The magnetic body 31 and the magnetic source 32 together form an induction machine. Specifically, the magnetic body 31 makes up a rotor of the induction machine, while the magnetic source 32 composes a stator of the same.

When the magnetic source 32 rotates together with the rotary shaft 6, it creates a rotating magnetic field which causes the magnetic body 31 to rotate at a rotational speed different from that of the magnetic source 32. In other words, there exists a rotational speed difference between the magnetic body 31 and the magnetic source 32, which corresponds to a slip of the induction machine.

Consequently, the magnetic body 31 produces a magnetic attraction to the magnetic source 32 as a function of the rotational speed difference, thereby suppressing fluctuations in rotational movement of the rotary shaft 6 of the automotive alternator 1.

More specifically, when the rotational speed of the automotive alternator 1 increases, the magnetic fluctuation suppressor 30 works as an induction motor so that the magnetic body 31 receives a driving torque from the magnetic source 32, in other words, it attracts the magnetic source 32 to decelerate.

On the contrary, when the rotational speed of the automotive alternator 1 decreases, the magnetic fluctuation suppressor 30 works as an induction generator so that the magnetic body 31, which rotates at a higher speed than the magnetic source 32 due to its moment of inertia, provides a driving torque to the magnetic source 32, in other words, it attracts the magnetic source 32 to accelerate.

The key factors of the magnetic fluctuation suppressor 30 can be determined by the following equations:

$$J_s = \mu J_a, \quad \text{(Equation 3)}$$

$$K_s = J_s \frac{K_a}{J_a}\left(\frac{1}{1+\mu}\right)^2, \quad \text{(Equation 4)}$$

$$C_s = 2J_s \sqrt{\frac{K_a}{J_a}}\sqrt{\frac{3\mu}{8(1+\mu)^3}}, \quad \text{(Equation 5)}$$

where $J_s$, $K_s$, and $C_s$ are respectively the moment of inertia, spring constant, and damping coefficient of the magnetic fluctuation suppressor 30, and $\mu$ is a given constant.

In this embodiment, the constant $\mu$ is set to 0.1, so that the moment of inertia $J_s$ of the magnetic fluctuation suppressor 30 is sufficiently smaller than the moment of inertia $J_a$ of the automotive alternator 1. The spring constant $K_s$ and damping coefficient $C_s$ of the magnetic fluctuation suppressor 30 are each set to a suitable value by adjusting the magnetic intensity of the permanent magnets 321 and the magnetoresistance of the base member 322 of the magnetic source 32.

It can be seen from FIG. 4 that the automotive alternator 1 has no resonance frequency $f_a$ in the range of 40 to 45 Hz. In other words, by employing the magnetic fluctuation suppressor 30, fluctuations in rotational movement of the automotive alternator 1 are successfully suppressed when the engine runs in the idling area.

In addition, the automotive alternator 1 has a new resonance frequency $f_a$ of about 50 Hz; however, this is not a problem, because the engine speed corresponding to the new resonance frequency is not in the idling area, and thus the engine will not continuously run at that speed.

Furthermore, since fluctuations in rotational movement of the automotive alternator 1 are suppressed, which has the largest moment of inertia among the auxiliary machines, the stability of the engine and thus that of the whole serpentine belt drive system are ensured.

To sum up, the automotive alternator 1 according to the present embodiment includes the magnetic fluctuation suppressor 30 that is configured with the magnetic body 31 and the magnetic source 32.

The magnetic body 31 is made of a magnetic material and has a predetermined mass. The magnetic body 31 is rotatably mounted on the rotary shaft 6 such that it is rotatable along with the rotary shaft 6 at a rotational speed different from that of the rotary shaft 6. The magnetic source 32 is fixedly mounted on the rotary shaft 6 so as to rotate at the same rotational speed as the rotary shaft 6.

The magnetic source 32 is configured to create a rotating magnetic field, by which the magnetic body 31 produces a magnetic attraction to the magnetic source 32 as a function of the rotational speed difference therebetween, thereby suppressing fluctuations in rotational movement of the automotive alternator 1.

Since the magnetic fluctuation suppressor 30 includes no mechanical element, such as a spring and a clutch, mechanical failure of the magnetic fluctuation suppressor 30 due to excessive stress and fatigue is prevented. Consequently, the reliability of the magnetic fluctuation suppressor 30 and thus that of the automotive alternator 1 are improved.

Moreover, compared to exiting mechanical fluctuation suppressors, the magnetic fluctuation suppressor 30 has a much simpler structure, thereby facilitating design and construction and reducing manufacturing cost.

Further, in the present embodiment, the magnetic body 31 includes the metal plate 311, which is made of a metal having a less electric resistivity than iron, and the base member 312 that is made of iron. The magnetic source 32 includes the permanent magnets 321 on an end face thereof facing the metal plate 311.

With such an arrangement, the magnetic body 31 and the magnetic source 32 together form an induction machine, so that the magnetic body 31 can produce the magnetic attraction to the magnetic source 32. Specifically, the rotating magnetic field created by the permanent magnets 321 of the magnetic source 32 induces eddy currents in the metal plate 311 of the magnetic body 31. Then, the interaction between the eddy currents and the rotating magnetic field produces the magnetic attraction in the direction suppressing the relative movement between the magnetic body 31 and the magnetic source 32.

Consequently, it becomes possible to impart a high capability of suppressing rotational movement fluctuations to the automotive alternator 1, without increasing the size and manufacturing cost of the automotive alternator 1.

In the present embodiment, the magnetic source 32 has the same number of magnetic poles as the rotor 3.

Consequently, it becomes possible to maximize the magnetic attraction through making the polar character of the magnetic source 32 coincident with that of the rotor 3, thereby minimizing the size and cost of the magnetic fluctuation suppressor 30.

In the present embodiment, the magnetic source 32 is configured with the permanent magnets 321 as described above.

Consequently, the magnetic source 32 can be made small and be easily fixed to the rotor 3. In addition, it is easy to adjust the magnetic attraction by changing the thickness and area of the permanent magnets 321.

In the present embodiment, the magnetic source 32 is provided on an axial end face of one of the rotor cores 7.

Consequently, it becomes easy for the magnetic source 32 to provide the rotating magnetic field to the magnetic body 31. In addition, it also becomes easy to fix the magnetic source 32 to the rotor 3.

In the present embodiment, the base portion 312 of the magnetic body 31 is so formed to include the blades 33a, which together make up the cooling fan 33.

Consequently, air resistance will act on the blades 33a when the magnetic body 31 rotates along with the magnetic source 32, thus producing a damping force against the magnetic body 31. This damping force allows the magnetic attraction to be made small, thus making it possible to reduce the size of the magnetic source 32. In addition, it also becomes possible to save the available space within the housing 4 by integrating the magnetic body 31 and the cooling fan 33, without sacrificing the cooling ability of the cooling fan 33.

In the present embodiment, the automotive alternator 1 is used in the serpentine belt drive system shown in FIG. 2.

In such a drive system, since the engine drives a plurality of auxiliary machines via a single belt, rotation of the engine is apt to become unstable.

However, by means of the magnetic fluctuation suppressor 30, fluctuations in rotational movement of the automotive alternator 1 are suppressed, which has the largest moment of inertia among the auxiliary machines, thereby ensuring the stability of rotation of the engine.

Second Embodiment

Figure 5:
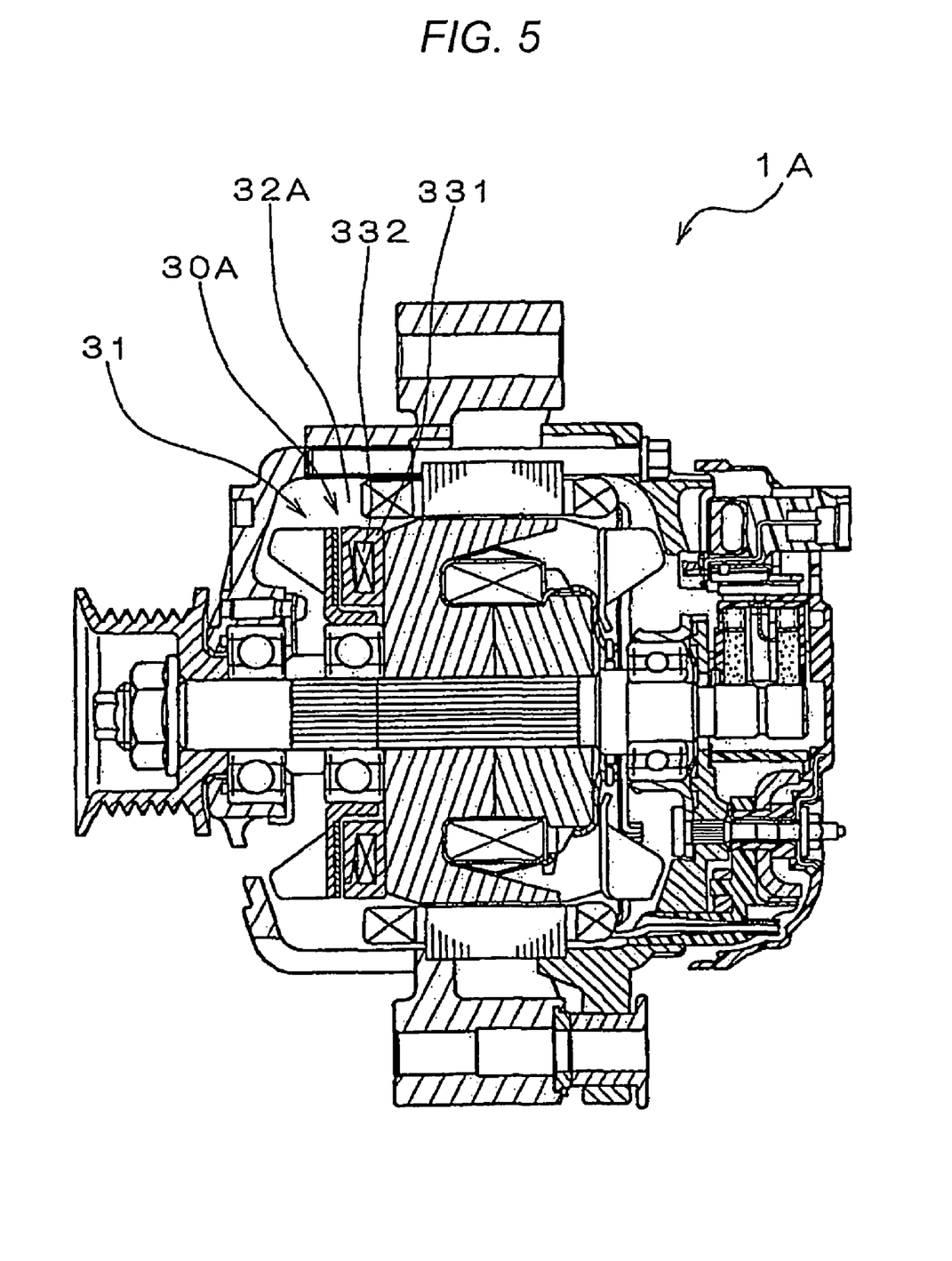
FIG. 5 is a cross-sectional view showing the overall configuration of an automotive alternator according to the second embodiment of the invention.

FIG. 5 shows the overall configuration of an automotive alternator 1A according to the second embodiment of the present invention.

The automotive alternator 1A includes a magnetic fluctuation suppressor 30A that is configured to suppress fluctuations in rotational movement of the alternator 1A. Except for the magnetic fluctuation suppressor 30A, the automotive alternator 1A has the same structure as the automotive alternator 1 according to the previous embodiment.

As shown in FIG. 5, the magnetic fluctuation suppressor 30A includes a magnetic body 31 and a magnetic source 32A. The magnetic body 31 of the magnetic fluctuation suppressor 30A has the same structure as that of the magnetic fluctuation suppressor 30 of the previous embodiment. However, dissimilar to the magnetic source 32 of the magnetic fluctuation suppressor 30, the magnetic source 32A is configured with a plurality of electromagnets instead of permanent magnets.

Specifically, the magnetic source 32A includes a pair of lundell type cores 331 and a winding 332 wound around the cores 331. The lundell type cores 331 have 16 claw poles formed therein, so that when the winding 332 is supplied with electric current, eight north magnetic poles and eight south magnetic poles are produced, which are positioned alternately in the circumferential direction.

With such a configuration, it is possible to control the magnetic intensity of the electromagnets of the magnetic source 32A through control of the electric current supply to the winding 332, thus allowing the magnetic attraction between the magnetic body 31 and the magnetic source 32A to have any necessary value.

Consequently, it becomes possible to optimally change the spring constant of the magnetic fluctuation suppressor 30A according to operating condition of the engine, thereby improving the fluctuation suppression capability of the magnetic fluctuation suppressor 30A. In addition, it also becomes possible, through stopping the electric current supply to the winding 332, to allow the magnetic body 31 not to produce the magnetic attraction at high rotational speed, thereby securing safety and reliability of the automotive alternator 1A.

Moreover, in the present embodiment, a plurality of magnetic poles are obtained by employing only the pair of lundell type cores 331 and the single winding 332, thereby reducing manufacturing cost of the magnetic source 32A.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments, the magnetic fluctuation suppressors are disposed to abut the rotor core 7 of the pulley 102 side. However, the magnetic fluctuation suppressors may also be disposed to abut the rotor core 7 of the slip rings side or to have a given distance from the rotor cores 7.

Moreover, in the previous embodiments, the magnetic fluctuation suppressors are employed to suppress fluctuations in rotational movement of the automotive alternators. However, the magnetic fluctuation suppressors may also be employed to suppress fluctuations in rotational movement of any rotary machines.

Such modifications, changes, and improvements within the skill of the art are intended to be covered by the appended claims.

What is claimed is:

1. An automotive alternator comprising:
   a rotary shaft;
   a pulley provided on said rotary shaft so as to transmit a rotating power from an engine to said rotary shaft;
   a stator including a stator winding;
   a rotor mounted on said rotary shaft and surrounded by said stator, said rotor being configured to provide a first rotating magnetic field to said stator; and
   a magnetic fluctuation suppressor including a magnetic body, which is made of a magnetic material and has a predetermined mass, and a magnetic source, said magnetic body being mounted on said rotary shaft such that said magnetic body is rotatable along with said rotary shaft at a rotational speed different from that of said rotary shaft, said magnetic source being fixed to said rotary shaft so as to provide said magnetic body with a second rotating magnetic field which causes said magnetic body to produce a magnetic attraction to said magnetic source by which fluctuations in rotational movement of said rotary shaft are suppressed,
   wherein said magnetic source of said magnetic fluctuation suppressor has the same number of magnetic poles as said rotor.

2. The automotive alternator as set forth in claim 1, wherein said magnetic body includes:
   a first member that is made of iron; and
   a second member that is made of a metal having an electric resistivity less than that of iron and positioned between said first member and said magnetic source, and
   wherein said magnetic source includes, on an end face thereof facing said second member of said magnetic body, a plurality of magnetic poles by which said second rotating magnetic field is created.

3. The automotive alternator as set forth in claim 1, wherein said magnetic source of said magnetic fluctuation suppressor is configured with a plurality of permanent magnets.

4. The automotive alternator as set forth in claim 1, wherein said magnetic source of said magnetic fluctuation suppressor is configured with a pair of lundell type cores and a winding wound around said cores.

5. The automotive alternator as set forth in claim 1, wherein said rotor includes a rotor core and a field winding wound around said rotor core, and wherein said magnetic source of said magnetic fluctuation suppressor is provided on an axial end face of said rotor core.

6. The automotive alternator as set forth in claim 1, wherein said magnetic body of said magnetic fluctuation suppressor is so formed to include a plurality of blades, on which air resistance acts when said magnetic body rotates along with said rotary shaft.

7. The automotive alternator as set forth in claim 1, wherein said pulley is to be driven by a belt of a serpentine belt drive system to transmit said rotating power from said engine to said rotary shaft.

8. The automotive alternator as set forth in claim 1, wherein the automotive alternator has an resonance frequency, a spring constant, and a mode equivalent moment of inertia, and the said magnetic fluctuator suppressor has a moment of inertia and a spring constant of magnetic fluctuation suppressor that are related by the following relationships:

$$f_a = \frac{1}{2\pi}\sqrt{\frac{k_a}{J_a}};$$

$$J_s = \mu J_a; \text{ and}$$

$$K_s = J_s \frac{K_a}{J_a}\left(\frac{1}{1+\mu}\right)^2:$$

where $f_a$, $K_a$, and $J_a$ are respectively the resonance frequency, the mode equivalent spring constant, and the mode equivalent moment of inertia of the automotive alternator, $J_s$ and $K_s$ are respectively the moment of inertia and the spring constant of said magnetic fluctuation suppressor, and $\mu$ is a given constant.

9. The automotive alternator as set forth in claim 8, wherein $\mu$=0.1.

* * * * *

UNITED STATES PATENT AND TRADEMARK OFFICE
CERTIFICATE OF CORRECTION

PATENT NO. : 7,560,837 B2  Page 1 of 1
APPLICATION NO. : 11/272319
DATED : July 14, 2009
INVENTOR(S) : Atsushi Umeda et al.

It is certified that error appears in the above-identified patent and that said Letters Patent is hereby corrected as shown below:

Title page, item (73) Assignee should read:     -- Denso Corporation, Kariya (JP) --

Signed and Sealed this

Thirtieth Day of March, 2010

David J. Kappos
*Director of the United States Patent and Trademark Office*